(12) United States Patent
Kai et al.

(10) Patent No.: US 9,047,707 B2
(45) Date of Patent: Jun. 2, 2015

(54) GRAPH DISPLAY DEVICE

(71) Applicant: Casio Computer Co., Ltd., Tokyo (JP)

(72) Inventors: Rie Kai, Akishima (JP); Aoi Abe, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 270 days.

(21) Appl. No.: 13/669,600

(22) Filed: Nov. 6, 2012

(65) Prior Publication Data

US 2013/0113824 A1 May 9, 2013

(30) Foreign Application Priority Data

Nov. 7, 2011  (JP) ................. 2011-243196

(51) Int. Cl.
*G06T 11/20* (2006.01)

(52) U.S. Cl.
CPC ..... *G06T 11/206* (2013.01); *G06T 2207/20072* (2013.01)

(58) Field of Classification Search
CPC .............. G06T 11/206; G06T 2207/20072
USPC ........................................................ 345/440
See application file for complete search history.

(56) References Cited

U.S. PATENT DOCUMENTS

| 5,535,317 | A * | 7/1996 | Tanaka et al. | 345/440 |
| 6,549,923 | B1 * | 4/2003 | Sudoh | 708/162 |
| 7,889,199 | B1 * | 2/2011 | Cherkas | 345/440 |
| 2007/0046674 | A1 * | 3/2007 | Sudoh | 345/440 |
| 2010/0225649 | A1 * | 9/2010 | Okano | 345/440 |
| 2010/0231596 | A1 * | 9/2010 | Matsuda | 345/440 |

FOREIGN PATENT DOCUMENTS

JP        9-146529 A        6/1997

\* cited by examiner

*Primary Examiner* — Phi Hoang
(74) *Attorney, Agent, or Firm* — Holtz, Holtz, Goodman & Chick PC (57) ABSTRACT

A graph display device includes a display module, a graph display control module which displays a graph corresponding to an expression on the display module, a specifying module which specifies a point on a graph displayed on the display module, a setting module which sets a tangent that contacts the graph at the specified point, an area determination module which, of two areas divided by the tangent set by the setting module, determines one area opposite to the area in which the graph lies to be a display area for coordinate values, and a coordinate value display control module which displays coordinate values of the specified point in the area determined by the area determination module.

20 Claims, 10 Drawing Sheets

GRAPH DISPLAY DEVICE

CROSS-REFERENCE TO RELATED APPLICATIONS

This application is based upon and claims the benefit of priority from prior Japanese Patent Application No. 2011-243196, filed Nov. 7, 2011, the entire contents of which are incorporated herein by reference.

BACKGROUND OF THE INVENTION

1. Field of the Invention

Embodiments described herein relate generally to a graph display device which displays a graph and coordinate values of an arbitrary point on the graph.

2. Description of the Related Art

With a conventional graphing scientific calculator, a graph corresponding to a function expression is displayed on a display module. When an arbitrary point on the graph is specified, the coordinate values of the point will be displayed near the specified point.

Since the coordinate values of an arbitrarily specified point are displayed in a fixed position determined for the point on the conventional graphing scientific calculator, the displayed coordinate values might overlap the graph, depending on the inclination or locus of the graph, which makes the graph and values very difficult to see.

A character display method of automatically searching for a position where characters or the like attached to a figure are easier to see and understand when the characters or the like cannot be displayed in an original position on a conventional image display device has been considered as disclosed in Jpn. Pat. Appln. KOKAI Publication No. 09-146529.

The character display method for the conventional image display device uses the technique for finding an evaluated value of the legibility of a character for each mesh obtained by dividing a screen to prevent characters and a figure from overlapping one another and determining a display position for the characters according to the evaluated value. However, the number of data items necessary to be prepared is large, making processing complicated.

BRIEF SUMMARY OF THE INVENTION

It is, accordingly, an object of the invention to provide a graph display device which enables a graph and coordinate values of a point on the graph to be displayed in a suitable position by a simple process.

According to the invention, there is provided a graph display device comprising: a display module; a graph display control module which displays a graph corresponding to an expression on the display module; a specifying module which specifies a point on a graph displayed on the display module; a setting module which sets a tangent that contacts the graph at the specified point; an area determination module which, of two areas divided by a tangent set by the setting module, determines one area opposite to the area in which the graph lies to be a display area for a coordinate value; and a coordinate value display control module which displays coordinate values of the specified point in the area determined by the area determination module.

In addition, according to the invention, there is provided a coordinate value display method in a graph display device with a display module, the coordinate value display method comprising: displaying a graph corresponding to an expression on the display module; specifying a point on a graph displayed on the display module; setting a tangent that contacts the graph at the specified point; determining, of two areas divided by the set tangent, one area opposite to the area in which the graph lies to be a display area for a coordinate value; and displaying coordinate values of the specified point in the determined area.

According to the invention, it is possible to display a graph and coordinate values of a coordinate point on the graph in suitable positions by a simple process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, an embodiment of the invention will be explained.

Figure 1:
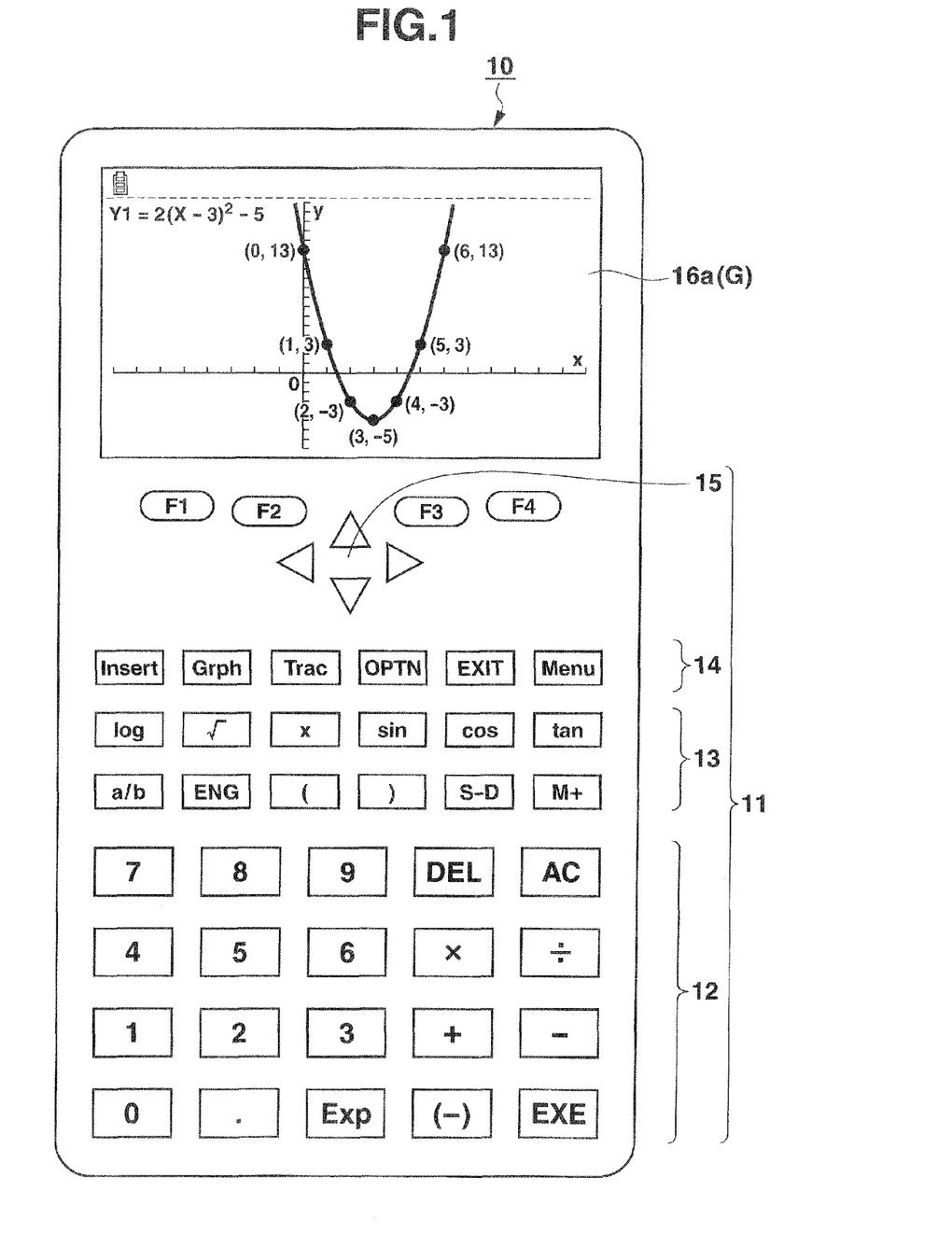
FIG. 1 is a front view showing an outer configuration of a graphing scientific calculator 10 according to an embodiment of a graph display device of the invention.

FIG. 1 is a front view showing an outer configuration of a graphing scientific calculator 10 according to an embodiment of a graph display device of the invention.

The graphing scientific calculator 10 is a small-sized calculator the user can hold in one hand and operate with one hand. On the front face of the body of the calculator 10, there are provided a key input module 11 and a liquid-crystal dot-matrix color display module 16.

The key input module 11 includes a number, character, and operation symbol key group 12 for inputting numbers, characters, or various arithmetic symbols or instructing to do calculations, a calculation function setting key group 13 for setting various functional capabilities or a memory function, a mode setting key group 14 for setting various operation modes or displaying a menu screen, cursor keys 15 for moving a cursor displayed on the display module 16 or selecting a data item, and function keys [F1] to [F4] for selectively specifying one of the functions displayed in menu form along the lower end of the display module 16.

As the number, character, and operation symbol key group 12, [0] to [9] (number) keys, [+] [−] [×] [÷] [=] (arithmetic symbol) keys, [DEL] (delete) key, [EXE] (execute) key, [AC] (clear) key, and the like are arranged.

As the calculation function setting key group 13, [log] (logarithm) key, [√] (square root) key, trigonometric function keys, including [sin] key, [cos] key, [tan] key, and the like are arranged.

As the mode setting key group 14, [Menu] key, [Insert] key, [Graph] key, [Trace] key, and [EXIT] (termination) key, and the like are arranged.

The graphing scientific calculator 10 has the function of determining a display area for coordinate values (x, y) of a point on a graph displayed on a graph screen G on the color display module 16.

Figure 2:
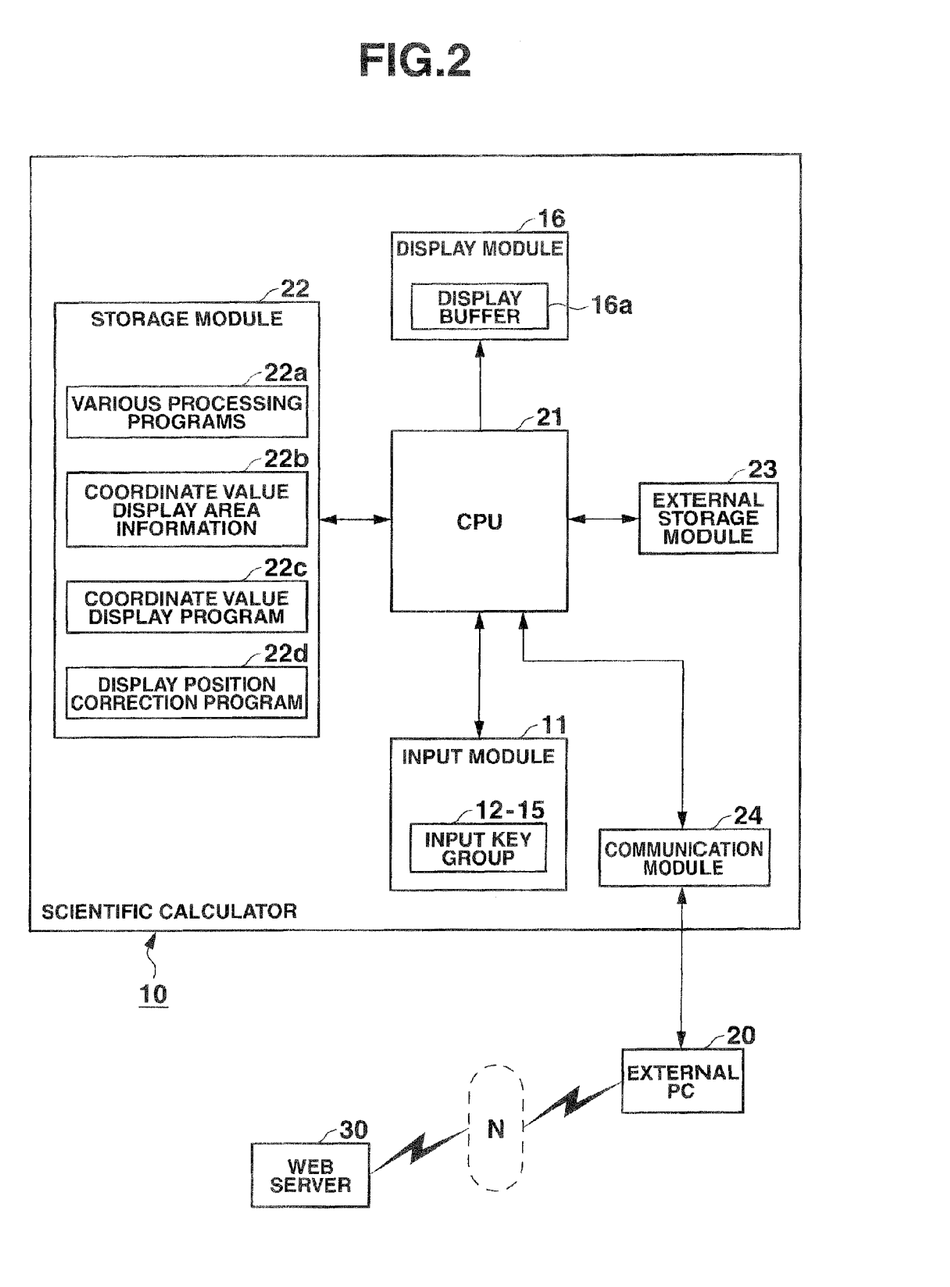
FIG. 2 is a block diagram showing a configuration of the electronic circuitry of the graphing scientific calculator 10.

FIG. 2 is a block diagram showing a configuration of the electronic circuitry of the graphing scientific calculator 10.

The graphing scientific calculator 10 includes a control module (CPU) 21 functioning as a computer.

The control module (CPU) 21 controls the operation of various parts of the circuitry according to a system program and various calculator processing programs 22a, 22c, 22d previously stored in a storage module 22. These programs may be read from an external storage module 23, such as a memory card, into the storage module 22 or downloaded from a Web server (program server) 30 on a communication network N into an external PC 20 and then read into the storage module 22 via a communication module 24. The system program and various calculator processing programs 22a, 22c, 22d stored in the storage module 22 are activated according to a key input signal from the key input module 11.

The storage module 22 stores not only a processing program 22a that controls four arithmetic operations, functional calculations, graph displaying, and the like but also a coordinate value display program 22c for displaying coordinate values of a point on a graph in an area outside a graph curve at the point, a display position correction program 22d for correcting the display position of a graph coordinate value so as to prevent the position from overlapping another graph or coordinate axes when the graph coordinate value is displayed, and the like.

Furthermore, secured in the storage module 22 is a coordinate value display area information storage module 22b for storing coordinate value display area specifying data set according to a user operation in a coordinate value display process according to the coordinate value display program 22c. The display area specifying data specifies whether to select an area [y>g(x)] above a tangent [y=g(x)] to a graph at a display target point in the y-direction or an area [y<g(x)] below the tangent.

Connected to the control module (CPU) 21 are the storage module 22, external storage module 23, communication module 24, key input module 11, and color display module 16.

The color display module 16 includes a display buffer 16a that has a memory area whose size is equal to the size of the display screen of the color display module 16. In the display buffer 16a, data on a bit map pattern created in a display screen size to be displayed on the color display module 16 is drawn.

The graphing scientific calculator 10 configured as described above realizes functions described in an explanation of operations below by controlling the operations of various parts of the circuitry according to the various calculator processing programs 22a, 22c, 22d read from the storage module 22 by the CPU 21 and instructions and data written in a default coordinate value display area storage module 22b and by causing software and hardware to cooperate with each other.

Next, an operation of the graphing scientific calculator 10 with the above configuration will be explained.

Figure 3:
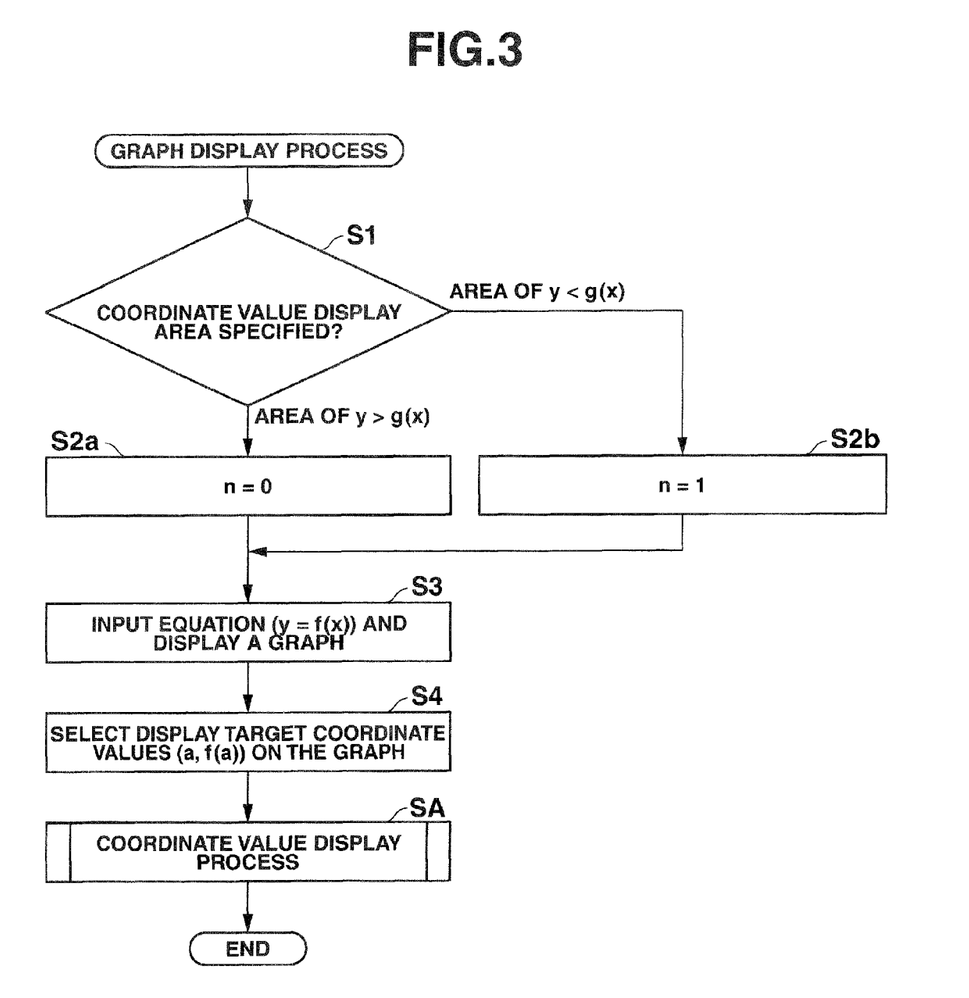
FIG. 3 is a flowchart to explain a graph display process in the graphing scientific calculator 10.

FIG. 3 is a flowchart to explain a graph display process in the graphing scientific calculator 10.

Figure 4:
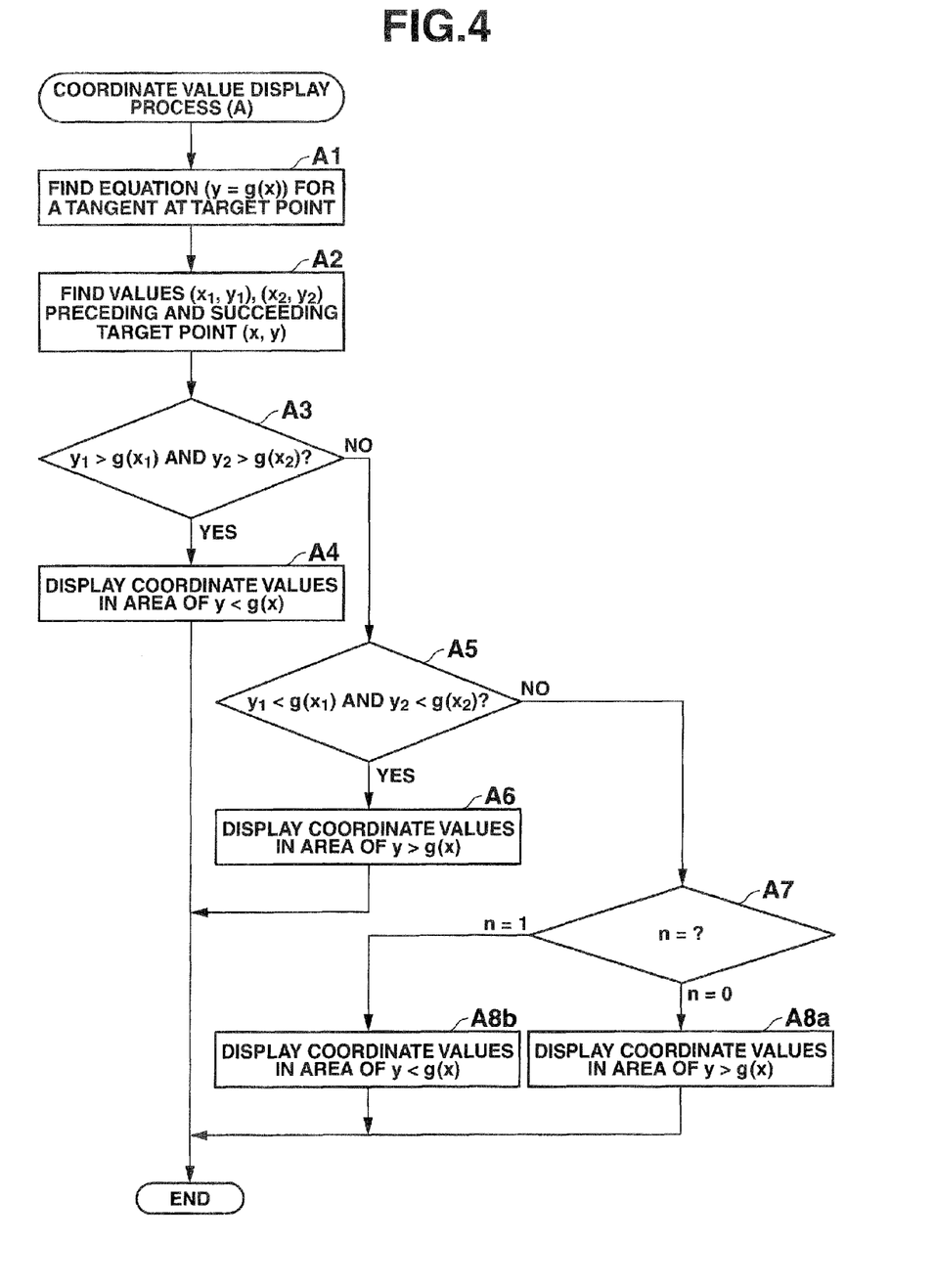
FIG. 4 is a flowchart to explain a coordinate value display process (A) in the graphing scientific calculator 10.

FIG. 4 is a flowchart to explain a coordinate value display process (A) in the graphing scientific calculator 10.

Figure 5:
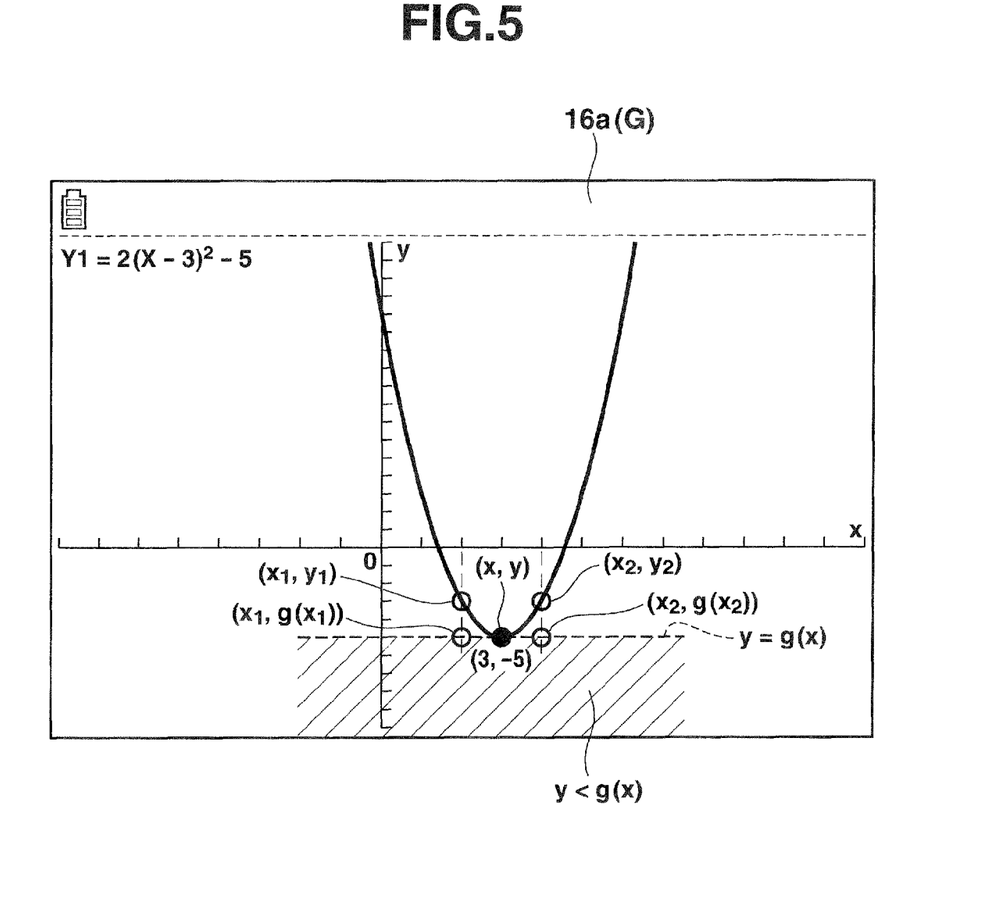
FIG. 5 shows a first concrete example of a display operation of displaying coordinate values of a point on a graph in the graphing scientific calculator 10.

FIG. 5 shows a first concrete example of a display operation of displaying coordinate values in the graphing scientific calculator 10.

In a graph display process, first, the user specifies a display area to display coordinate values of a point on a graph. As for a display area for coordinate values, suppose a tangent [y=g(x)] to a graph at a point on the graph whose coordinate values are to be displayed. It is specified whether to display the coordinate values in an area above or below the tangent.

A setting screen (not shown) for setting graph display conditions is displayed according to a user operation on the key input module 11. When an area [y>g(x)] above the tangent [y=g(x)] to a graph in the y-direction has been specified as an area that displays coordinate values (x, y) of a point on the graph, the area specifying data [n=0] is stored in the coordinate value display area information storage module 22b (step S1 to S2a).

Conversely, when an area [y<g(x)] below the tangent [y=g(x)] to the graph in the y-direction has been specified, the area specifying data [n=1] is stored in the coordinate value display area information storage module 22b (step S1→S2b).

Next, when the user has input equation Y=f(X) to display a graph, a graph corresponding to the equation is displayed on the display module 16 (step S3). For example, when the user has input $[Y1=2(X-3)^2-5]$ to display a graph, a quadratic function graph Y1 is written together with coordinate axes x, y into the display buffer 16a and displayed as a graph screen G on the color display module 16, as shown in FIG. 5.

Next, when the user has specified a point on graph Y1, coordinate values the user wants to display have been selected (step S4). For example, a graph feature-point extracting function has specified a local minimum point of a currently displayed graph, coordinate values (3, −5) of the local minimum point (x, y) are selected. Then, a coordinate value display process (A) shown in FIG. 4 is started (step SA).

In the coordinate value display process (A), first, equation [y=g(x)] for a tangent to graph Y1 at the target point (x, y) is calculated (step A1). In this example, [y=−5] is given.

Next, coordinates of a point on the graph in positions preceding and succeeding the target point (x, y) in the x-direction are found (step A2). For example, coordinate values (2, −3) of a preceding point (x1, y1) in a position corresponding to x−1 and coordinate values (4, −3) of a succeeding point (x2, y2) in a position corresponding to x+1 are calculated.

Then, it is determined whether value y1 is larger than y-value [g(x1)] of a point on a tangent in preceding position x1 and it is determined whether value y2 is larger than y-value [g(x2)] of a point on a tangent in succeeding position x2 (step A3).

In this case, it has been determined that the y-value (=−3) of preceding point (x1, y1) on graph Y1 is larger than the y-value (=−5) of preceding point (x1, g(x1)) on the tangent

[y=g(x)] and that the y-value (=−3) of succeeding point (x2, y2) on graph Y1 is larger than the y-value (=−5) of succeeding point (x2, g(x2)) on the tangent [y=g(x)] [y1>g(x1) AND y2>g(x2)] (step A3 [Yes]).

Therefore, it is recognized that graphs Y1 preceding and succeeding the target point (x, y) both curve so as to be convex toward the upper area in the y-direction with respect to the tangent [y=g(x)]. Then, an area [y<g(x)] below the tangent [y=g(x)] in the y-direction is determined to be a coordinate value display area. That is, an area outside the curve of graph Y1 at the target point (x, y) is determined. Then, its coordinate values (3, −5) are displayed in a position at a specific distance from and close to the target point (x, y) in the determined display area (step A4).

On the other hand, if it has been determined that the y-value of preceding point (x1, y1) on graph Y1 is smaller than the y-value of preceding point (x1, g(x1)) on the tangent [y=g(x)] and that the y-value of succeeding point (x2, y2) on graph Y1 is smaller than the y-value of succeeding point (x2, g(x2)) on the tangent [y=g(x)] [y1<g(x1) AND y2<g(x2)] (step A5 [Yes]), it is recognized that graphs Y1 preceding and succeeding the target point (x, y) both curve so as to be convex toward the lower area in the y-direction with respect to the tangent [y=g(x)]. In this case, an area [y>g(x)] above the tangent [y=g(x)] in the y-direction is determined to be a coordinate value display area. That is, an area outside the curve of graph Y1 at target point (x, y) is determined. Then, coordinate values of display target point (x, y) are displayed in the coordinate value display area [y>g(x)] (step A6).

If neither the determination conditions in step A3 nor those in step A5 are fulfilled (step A3 [No]→A5 [No]), area specify data n stored in the coordinate value display area information storage module 22b is read and it is determined which one of [n=0] and [n=1] is given (step A7).

If it has been determined that [n=0] has been given, an area [y>g(x)] above tangent [y=g(x)] at the target point (x, y) is determined to be a coordinate value display area and coordinate values of target point (x, y) are displayed (step A7→A8a).

If it has been determined that [n=1] has been given, an area [y<g(x)] below tangent [y=g(x)] at the target point (x, y) is determined to be a coordinate value display area and coordinate values of target point (x, y) are displayed (step A7→A8b).

Figure 6:
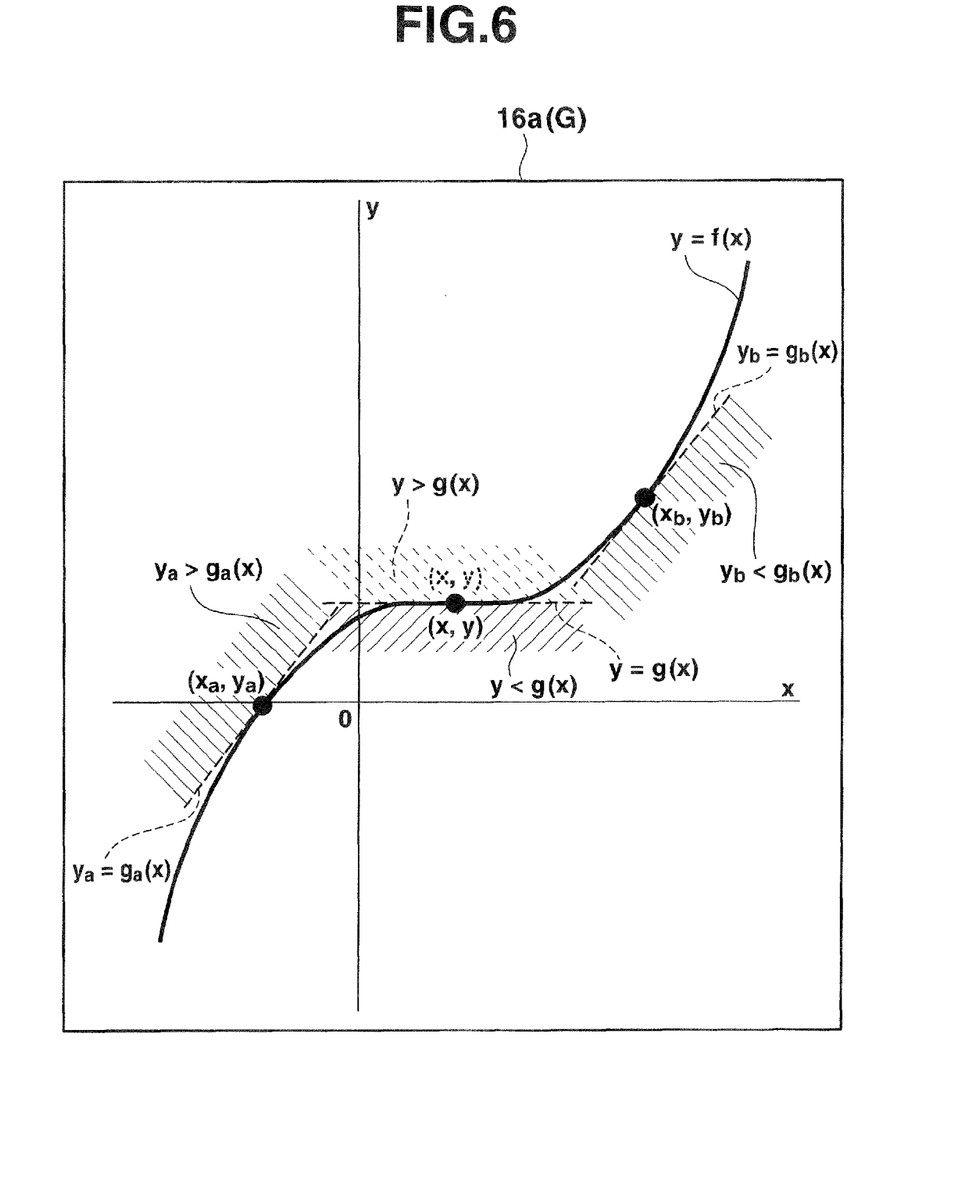
FIG. 6 shows a second concrete example of a display operation of displaying coordinate values of a point on a graph in the graphing scientific calculator 10.

FIG. 6 shows a second concrete example of a display operation of displaying coordinate values on a graph in the graphing scientific calculator 10.

As shown in FIG. 6, if target point (xa, ya) is specified when a cubic function graph y=f(x) has been displayed on a graph screen G, a coordinate value display process (A) determines that [y1<ga(x1) AND y2<ga(x2)] holds (step A5 [Yes]) and it is recognized that graph y=f(x) preceding and succeeding target point (xa, ya) both curve so as to be convex toward an area below tangent [ya=ga(x)] in the y-direction. Therefore, an area [ya>ga(x)] above tangent [ya=ga(x)] in the y-direction is determined to be a coordinate value display area and its coordinate values (xa, ya) are displayed (step A6).

In addition, if target point (xb, yb) has been specified, it is determined that [y1>gb(x1) AND y2>gb(x2)] holds (step A3 [Yes]) and it is recognized that graph y=f(x) preceding and succeeding target point (xb, yb) both curve so as to be convex toward an area above tangent [yb=gb(x)] in the y-direction. Therefore, an area [yb<gb(x)] below tangent [yb=gb(x)] in the y-direction is determined to be a coordinate value display area and its coordinate values (xb, yb) are displayed (step A4).

Furthermore, if target point (x, y) is specified, neither the determination conditions in step A3 nor those in step A5 are fulfilled (step A3 [No]→A5 [No]). Therefore, area specify data n stored in the coordinate value display area information storage module 22b is read (step A7).

Then, if it has been determined that [n=0] has been given, an area [y>g(x)] above tangent [y=g(x)] at the display target point (x, y) is determined to be a coordinate value display area and coordinate values of the display target point (x, y) are displayed (step A7→A8a).

If it has been determined that [n=1] has been given, an area [y<g(x)] below tangent [y=g(x)] at the display target point (x, y) is determined to be a coordinate value display area and coordinate values of the display target point (x, y) are displayed (step A7→A8b).

As described above, by the coordinate value display process (A) in the graphing scientific calculator 10 with the above configuration, an area outside the graph curve is determined to be a coordinate value display area, enabling its coordinate values to be displayed in suitable positions without overlapping the graph.

Accordingly, coordinate values of a coordinate point on a graph can be displayed in suitable positions together with the graph by a simple process.

Figure 7:
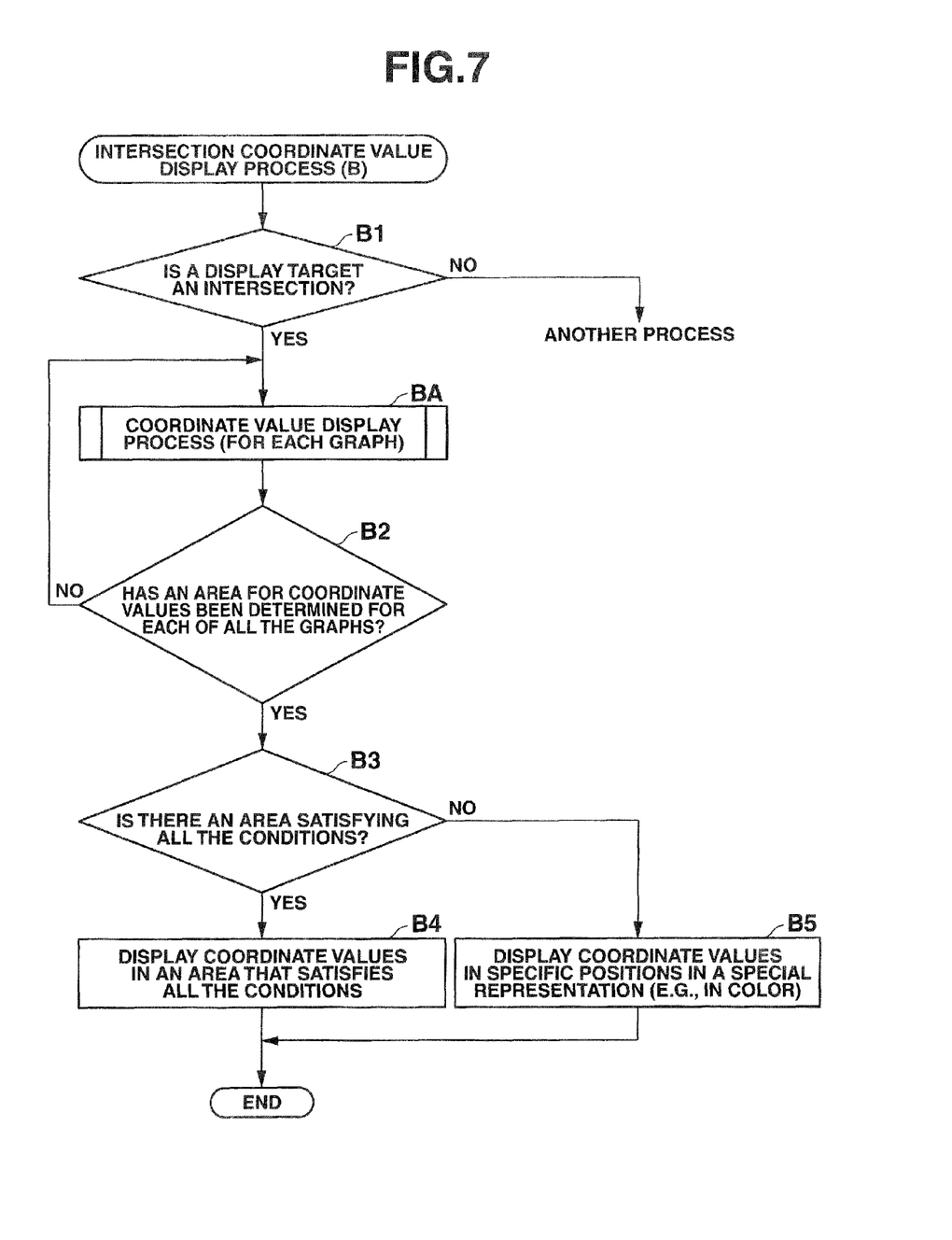
FIG. 7 is a flowchart to explain an intersection coordinate value display process (B) in the graphing scientific calculator 10.

FIG. 7 is a flowchart to explain an intersection coordinate value display process (B) in the graphing scientific calculator 10.

The intersection coordinate value display process (B) is executed in place of the coordinate value display process (A) when a target point selected by a display target coordinate value selecting process (step S4) on a graph in the graph display process (see FIG. 3) is the intersection of graphs.

A process in step BA included in the intersection coordinate value display process (B) is the same as the coordinate value display process (A). In this process, a coordinate value display area is determined for each set of graphs that create an intersection.

Figure 8:
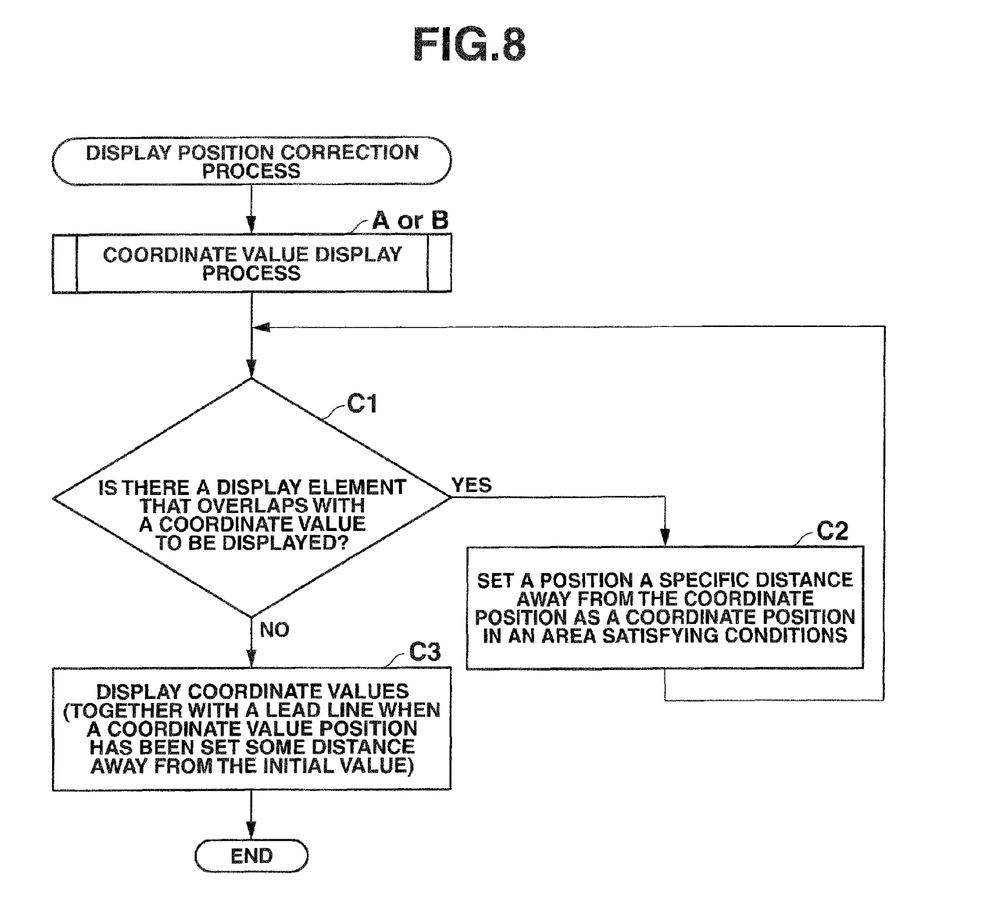
FIG. 8 is a flowchart to explain a drawing position correction process in the graphing scientific calculator 10.

FIG. 8 is a flowchart to explain a display position correction process.

Figure 9A:
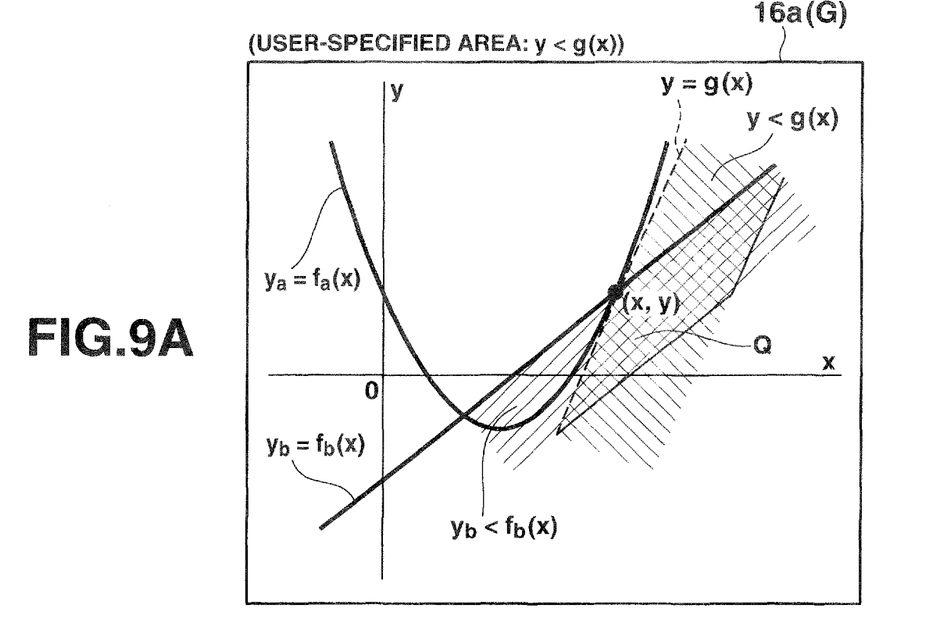
FIGS. 9A and 9B show a first concrete example of a display operation of displaying coordinate values of an intersection of graphs in the graphing scientific calculator 10.
Figure 9B:
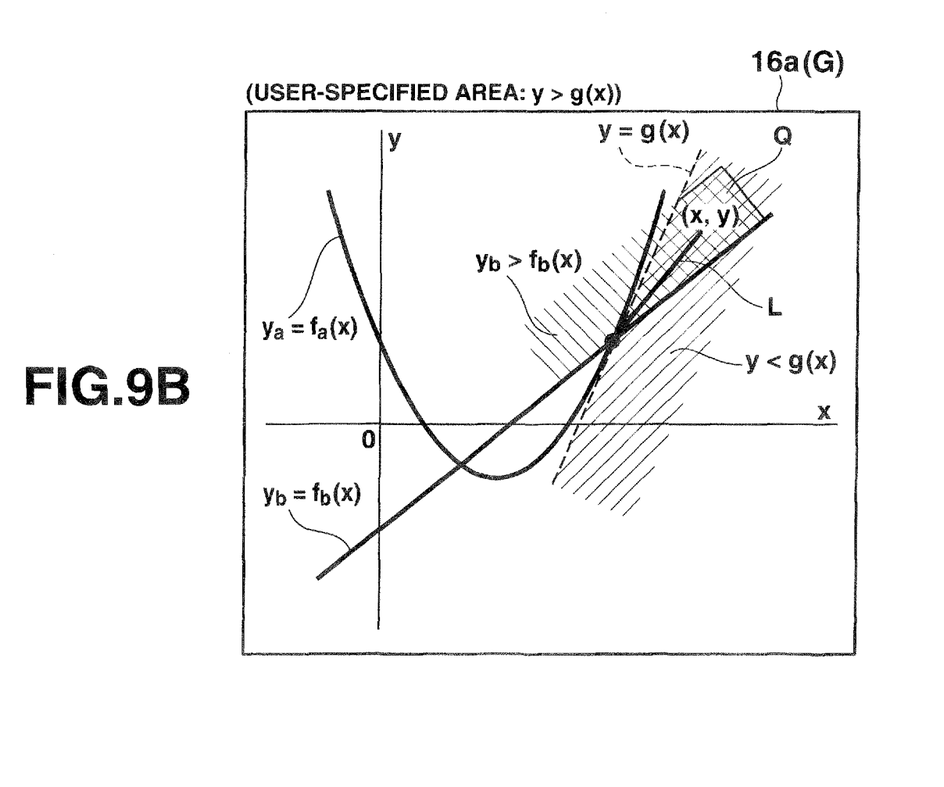

FIGS. 9A and 9B show a first concrete example of a display operation of displaying intersection coordinate values in the graphing scientific calculator 10.

As shown in FIG. 9A, when the user has specified that a coordinate value display area is [y<g(x)] (n=1) (step S1→S2b) and input a quadratic function graph ya=fa(x) and a linear function graph yb=fb(x), two graphs, ya=fa(x) and yb=fb(x), are displayed together with coordinate axes x, y on a graph screen G (step S3).

Then, when an intersection (x, y) of graph ya and graph yb has been specified as a display target point (step S4), control is passed to the intersection coordinate value display process (B) shown in FIG. 7.

First, it has been determined that a display target is intersection (x, y) (step B1 [Yes]), the coordinate value display process (A) (see FIG. 4) determines a coordinate value display area for each set of graphs ya, yb that create an intersection (x, y) (step BA).

Specifically, as for a quadratic function graph ya, an area [y<g(X)] below tangent [y=g(x)] at intersection (x, y) in the y-direction is determined to be a coordinate value display area (steps A1 to A4). In addition, as for a linear graph yb, since a tangent at intersection (x, y) coincides with the graph yb, a lower area [yb<fb(x)] of the graph yb in the y-direction is determined to be a coordinate value display area according to the coordinate value display area [y<g(x)] (n=1) specified by the user (steps A1, A2, A7, A8b).

Then, if it has been determined that a coordinate value display area has been determined for each of all the graphs that creates an intersection (x, y) (step B2 [Yes]), it is determined whether there is an area that satisfies all of the area conditions, that is, whether there is an area common to each area [y<g(X)] [yb<fb(x)] (step B3).

Here, if it has been determined that there is an area Q common to the coordinate value display area [y<g(X)] for the quadratic function graph ya and the coordinate value display area [yb<fb(x)] for the linear function graph yb (step B3 [Yes]), the area Q is determined to be a coordinate value display area and coordinate values of graph intersection (x, y) are displayed in the area (step B4).

If it has been determined in step B3 that there is no area that satisfies all the area conditions, that is, that there is no area common to the coordinate value display areas determined for the individual graphs (step B3 [No]), coordinate values of an intersection are displayed in a special representation in such a manner that, for example, they are displayed in color in specific positions along the lower end of the graph screen G (step B5).

As described above, in the intersection coordinate value display process (B), when a display target point on a graph is an intersection of a plurality of graphs, a coordinate value display area corresponding to each graph that creates an intersection is determined by the coordinate value display process (1) in FIG. 4 and an area common to the individual coordinate value display areas is determined to be a display area for the intersection coordinate values.

Therefore, a display area suitable for coordinate values of an intersection of graphs can be determined, which enables the coordinate values of the intersections to be displayed without overlapping each graph.

The following is an explanation of a display position correction process (see FIG. 8) when display elements, such as other graphs or coordinate axes, have overlapped one another in displaying coordinate values in a coordinate value display area determined by the coordinate value display process (A) of FIG. 4 or the intersection coordinate value display process (B) of FIG. 7.

The user has specified that a coordinate value display area is [y>g(x)] (n=0) (step S1→S2a) and a quadratic function graph ya=fa(x) and a linear function graph yb=fb(x) have been displayed on a screen as shown in FIG. 9B.

Here, when an intersection (x, y) have been selected as a display target point (step S1→S2a to S4), the intersection coordinate value display process (B) of FIG. 7 is performed as described above.

Specifically, a coordinate value display area is determined for each of graphs ya, yb that create the intersections (x, y) by the similar coordinate value display process (A) (see FIG. 4) (steps BA, B2 [Yes]). In this case, as for the quadratic function graph ya, a coordinate value display area is determined to be an area [y<g(X)] (steps A1 to A4). As for the linear function graph yb, a coordinate value display area is determined to be an area [yb>fb(x)] according to the coordinate value display area [y>g(x)] (n=0) specified by the user (steps A1, A2, A7, A8a).

Here, if it has been determined that there is an area Q common to the coordinate value display area [y<g(X)] for the quadratic function graph ya and the coordinate value display area [yb>fb(x)] for the linear function graph yb (step B3 [Yes]), the area Q is determined to be a coordinate value display area (step B4).

At this time, in the display area Q of the intersection coordinate values (x, y) determined as shown in FIG. 9B, when the coordinate values (x, y) are displayed positions at a specific distance from and close to the intersection, it is determined that display elements of each of graphs ya and yb overlap the display coordinate values (x, y) (step C1 [Yes]).

Then, in the determined coordinate value display area Q, a correction is made by setting a position another specific distance away from the intersection as a coordinate value display position (step C2).

Then, when it has been determined that display elements of each of graphs ya and yb do not overlap the corrected coordinate value display position (step C1 [No]), coordinate values (x, y) of the intersection are displayed in the corrected coordinate value display position, with a lead line L extending from the intersection (step C3).

Figure 10:
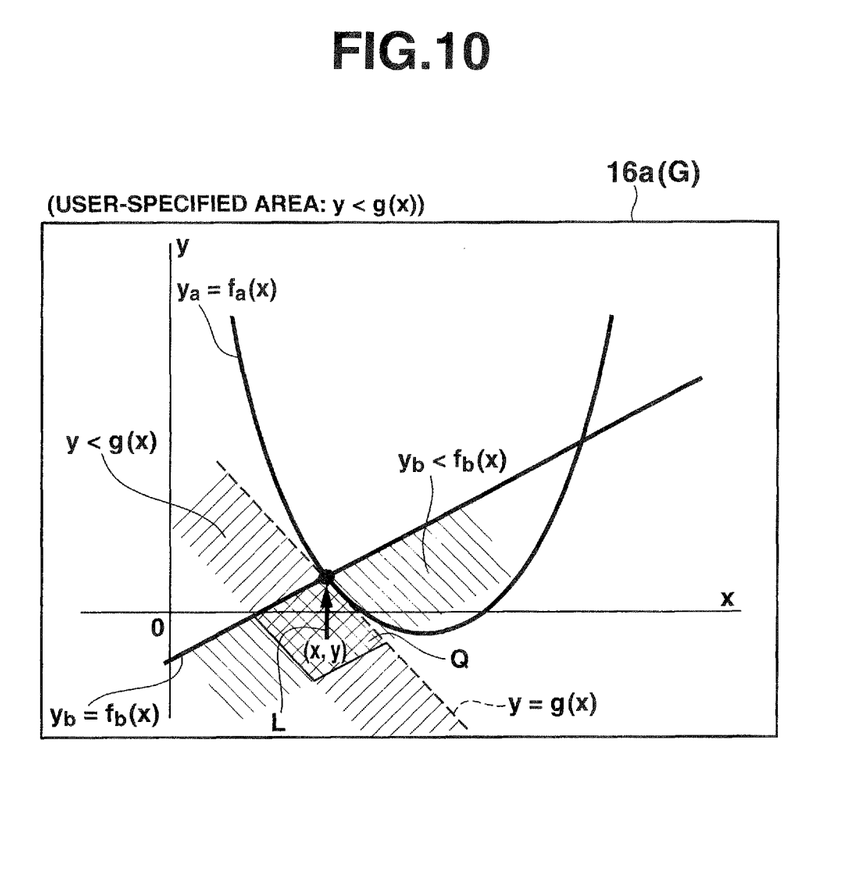
FIG. 10 shows a second concrete example of a display operation of displaying coordinate values of an intersection of graphs in the graphing scientific calculator 10.

FIG. 10 shows a second concrete example of a display operation of displaying coordinate values of an interconnection of graphs.

The user has specified that a coordinate value display area is [y<g(x)] (n=1) (step S1→S2a) and a quadratic function graph ya=fa(x) and a linear function graph yb=fb(x) are displayed on a screen as shown in FIG. 10.

If the intersection (x, y) is set as a display target, the interconnection coordinate value display process (B) of FIG. 7 is performed.

Then, an area common to a coordinate value display area [y<g(x)] determined for intersection (x, y) on graph ya and a coordinate value display area [yb<fb(x)] determined for intersection (x, y) on graph yb is determined to be a display area for coordinate values (x, y) of the intersection (steps B1 to B4).

At this time, it has been determined that the coordinate axis x overlaps a coordinate value display position at a specific distance from and close to the intersection in the determined coordinate value display area Q (step C1 [Yes]). Then, a correction is made by setting a position another specific distance away from the intersection as a coordinate value display position (step C2).

Then, when it has been determined that the coordinate axis x does not overlap the corrected coordinate value display position (step C1 [No]), coordinate values (x, y) of the intersection are displayed in the corrected coordinate value display position, with a lead line L extending from the intersection (step C3).

Display correction of coordinate values of an intersection has been explained. Even when a coordinate value display area for an arbitrary coordinate point on graph y has been determined by the coordinate value display process (A) of FIG. 4 (see FIGS. 5 and 6), coordinate values of a target point can be displayed in positions that do not overlap display elements by executing steps C1 to C3.

As described above, with the display position correction process performed in addition to the coordinate value display processes (A) and (B), when it has been determined that the determined coordinate value display position will possibly overlap display elements, such as another graph or a coordinate axis, the determined coordinate value display position is corrected to be a coordinate value display position that does not overlap the display elements, which enables coordinate values to be displayed in an easy-to-see position.

The operating methods of the graphing scientific calculator 10 described in the embodiments, that is, the individual methods including the graph display process explained in the flowchart of FIG. 3, the coordinate value display process (A) associated with the graph display process explained in the flowchart of FIG. 4, the intersection coordinate value display process (B) associated with the graph display process explained in the flowchart of FIG. 7, and the display position correction process added to the coordinate value display process (A) or intersection coordinate value display process (B) explained in the flowchart of FIG. 8, can be stored in the external recording medium (23), such as a memory card (for example, ROM card or RAM card), a magnetic disk (for example, floppy disk or hard disk), an optical disk (for example, CD-ROM or DVD), or a semiconductor memory, in the form of programs the computer can execute. Then, the mediums can be delivered. The computer (21) of the calculator (10) loads the programs stored in the external recording medium (23) into the storage device (22). The computer is controlled by the loaded programs, thereby realizing a graph coordinate point optimum display area/position setting function explained in the embodiments, which enables the same processes in the aforementioned methods to be carried out.

Furthermore, the data of the programs which realize the above methods can be transferred in the form of program code through a communication network (public lines) N. The program data can be loaded by communication devices (24) connected to the communication network N into the computer (21) of the calculator (10), thereby realizing the graph coordinate point optimum display area/position setting function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A graph display device comprising:
a display module; and
a CPU which is programmed to perform functions including:
displaying a graph corresponding to an expression on the display module;
specifying a point on a graph displayed on the display module;
setting a tangent that contacts the graph at the specified point;
determining, of two areas divided by the set tangent, one area opposite to the area in which the graph lies to be a display area for coordinate values; and
displaying coordinate values of the specified point in the determined area.

2. The graph display device of claim 1, wherein the CPU is further programmed to calculate an expression for the tangent that contacts the graph at the specified point, and
wherein the determining one area includes determining where the graph lies based on the comparison result of the expression of the graph and the expression of the tangent in terms of y-value in positions preceding and succeeding the specified point in the x-direction.

3. The graph display device of claim 2, wherein the CPU is further programmed to:
prompt the user to specify whether an area where coordinate values are to be displayed is set above or below the tangent,
wherein the determining one area includes determining an area specified by the user to be a display area when one area where the graph lies is unable to be determined.

4. The graph display device of claim 3, wherein the CPU is further programmed to perform functions including:
determining whether another display element overlaps the displayed coordinate values; and
correcting the display position of the coordinate values to be a position that does not overlap another display element in the same determined area when it has been determined that another display element overlaps the coordinate values.

5. The graph display device of claim 3, wherein the CPU is further programmed to:
acquire an area common to a display area for coordinate values determined for each graph by determining one area when the specified point is an intersection of a plurality of graphs,
wherein the determining one area includes determining the acquired common area to be a display area for coordinate values of an intersection.

6. The graph display device of claim 5, wherein the CPU is further programmed to display coordinate values of the intersection in a predetermined position in a special representation when the common area was unable to be acquired.

7. The graph display device of claim 6, wherein the CPU is further programmed to perform functions including:
determining whether another display element overlaps the displayed coordinate values; and
correcting the display position of the coordinate values to be a position that does not overlap another display element in the same determined area when it has been determined that another display element overlaps the coordinate values.

8. A coordinate value display method in a graph display device with a display module, the coordinate value display method comprising:
displaying a graph corresponding to an expression on the display module;
specifying a point on a graph displayed on the display module;
setting a tangent that contacts the graph at the specified point;
determining, of two areas divided by the set tangent, one area opposite to the area in which the graph lies to be a display area for coordinate values; and
displaying coordinate values of the specified point in the determined area.

9. The coordinate value display method of claim 8, further comprising:
calculating an expression for the tangent that contacts the graph at the specified point,
wherein the determining one area includes determining an area where the graph lies based on the comparison result of the expression of the graph and the expression of the tangent in terms of y-value in positions preceding and succeeding the specified point in the x-direction.

10. The coordinate value display method of claim 9, further comprising:
prompting the user to specify whether an area where coordinate values are to be displayed is set above or below the tangent,
wherein the determining one area includes determining an area specified by the user to be a display area when one area where the graph lies is unable to be determined.

11. The coordinate value display method of claim 10, further comprising:
determining whether another display element overlaps the displayed coordinate values; and
correcting the display position of trio coordinate values to be a position that does not overlap another display element in the same determined area when it has been determined that another display element overlaps the coordinate values.

12. The coordinate value display method of claim 10, further comprising:
acquiring an area common to a display area for coordinate values determined for each graph by the determining one area when the specified point is an intersection of a plurality of graphs,
wherein the determining one area includes determining the acquired common area to be a display area for coordinate values of an intersection.

13. The coordinate value display method of claim 12, further comprising:
displaying coordinate values of the intersection in a predetermined position in a special representation when the common area was unable to be acquired.

14. The coordinate value display method of claim 13, further comprising: determining whether another display element overlaps the displayed coordinate values; and
correcting the display position of the coordinate values to be a posit on that does not overlap another display element in the same determined area when it has been determined that another display element overlaps the coordinate values.

15. A non-transitory recording medium in which a program that causes a computer with a display module to execute processing has been recorded, the processing comprising:
a process of displaying a grab corresponding to an expression on the display module;
a process of specifying a point on a graph displayed on the display module;
a process of setting a tangent that contacts the graph at the specified point;
a process of determining, of two areas divided by the set tangent, one area opposite to the area in which the graph lies to be a display area for coordinate values; and
a process of displaying coordinate values of the specified point in the determined area.

16. The non-transitory recording medium of claim 15, wherein the processing further comprises a process of calculating an expression for the tangent that contacts the graph at the specified point, and
the process of determining one area includes determining an area where the graph lies based on the comparison result of the expression of the graph and the expression of the tangent in terms of y-value in positions preceding and succeeding the specified point in the x-direction.

17. The non-transitory recording medium of claim 16, wherein the processing further comprises a process of prompting the user to specify whether an area where coordinate values are to be displayed is set above or below the tangent,
wherein the process of determining one area includes determining an area specified be the user to be a display area when one area where the graph lies is unable to be determined.

18. The non-transitory recording medium of claim 17, wherein the processing further comprises
a process of determining whether another display element overlaps the displayed coordinate values; and
a process of correcting the display position of the coordinate values to be a position that does not overlap another display element in the same determined area when it has been determined that another display element overlaps the coordinate values.

19. The non-transitory recording medium of claim 17, wherein the processing further comprises a process of acquiring an area common to a display area for coordinate values determined for each graph by the determining one area when the specified point is an intersection of a plurality of graphs,
wherein the process of determining one area includes determining the acquired common area to be a display area for coordinate values of an intersection.

20. The non-transitory recording medium of claim 15, wherein the processing further comprises a process of displaying coordinate values of the intersection in a predetermined position in a special representation when the common area was unable to be acquired.

* * * * *

UNITED STATES PATENT AND TRADEMARK OFFICE
CERTIFICATE OF CORRECTION

Page 1 of 1

PATENT NO.        : 9,047,707 B2
APPLICATION NO.   : 13/669600
DATED             : June 2, 2015
INVENTOR(S)       : Rie Kai et al.

It is certified that error appears in the above-identified patent and that said Letters Patent is hereby corrected as shown below:

In the claims

Column 10, claim 11, line 5, delete "trio" and insert --the--.

Column 11, claim 14, line 5, delete "posit on" and insert --position--.

Column 11, claim 15, line 4, delete "grab" and insert --graph--.

Column 12, claim 17, line 7, delete "be" and insert --by--.

Signed and Sealed this
Twenty-ninth Day of December, 2015

Michelle K. Lee
*Director of the United States Patent and Trademark Office*